Figure 1:
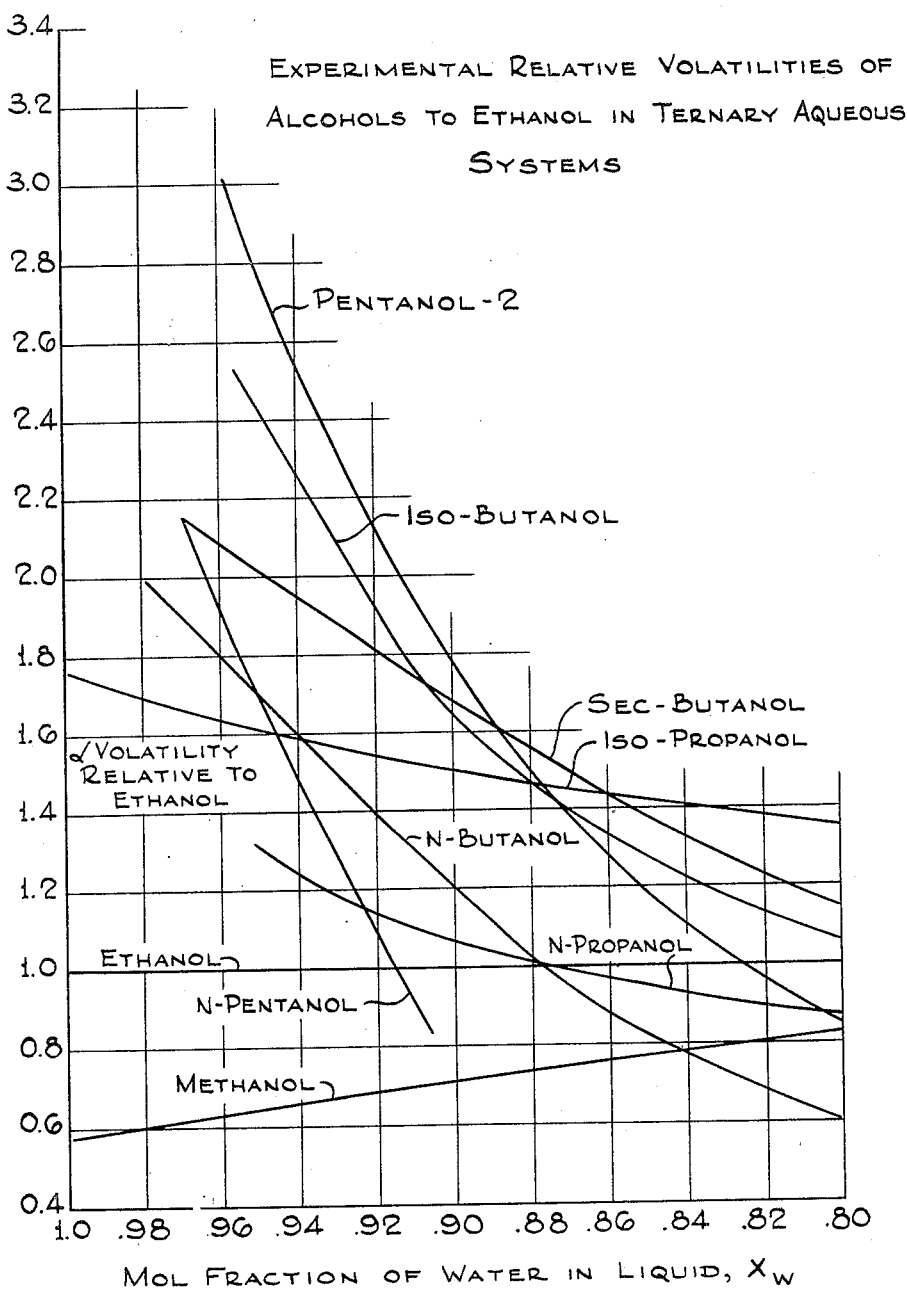

Patented May 8, 1951

2,551,626

UNITED STATES PATENT OFFICE 2,551,626

SEPARATION OF NORMAL ALCOHOLS FROM BRANCHED CHAIN ALCOHOLS

Charles E. Morrell, Westfield, Carl S. Carlson, Elizabeth, and Paul V. Smith, Jr., Westfield, N. J., assignors to Standard Oil Development Company, a corporation of Delaware Application June 24, 1948, Serial No. 34,897

8 Claims. (Cl. 202—39.5)

This invention relates to a practical method of separating wide-boiling mixtures of oxygenated organic compounds and more particularly relates to a process for the segregation of the lower boiling normal primary alcohols from such a wide-boiling mixture. More particularly the invention is concerned with a process for separating normal primary alcohols from branched primary, secondary and tertiary alcohols contained in a mixture (1) in which ethanol is the major alcohol component and in which the other alcohols are present in minor proportions relative to ethanol, (2) by means of water extractive distillation employing 83–93.5 mol per cent water, preferably 86–91 mol per cent, in the internal liquid reflux.

In Serial No. 34,896, filed June 24, 1948, there is described a process for separating normal primary alcohols from branched primary alcohols and secondary and tertiary alcohols by water extractive distillation in which the mixture containing these alcohols is subjected to a preliminary fractional distillation step prior to the application of water extractive distillation to the individual fractions. This preliminary fractionation can be avoided and the separation effected according to the terms of this invention provided the two conditions specified above exist.

Wide-boiling mixtures of oxygenated organic compounds may be obtained, for example, by the Fischer synthesis in which carbon monoxide is reacted with hydrogen to produce a mixture of hydrocarbons and oxygenated organic compounds which separate into an oil layer and a water layer, both of which contain various hydrocarbons, ketones, aldehydes, ethers, acetals, ketals, esters, carboxylic acids, normal primary, branched chain primary, secondary, and tertiary alcohols of a wide range of molecular weights. The process of the present invention is particularly adapted to the treatment of the water layer from the Fischer synthesis but may also be applied to the oil layer and gas phases after an appropriate scrubbing procedure, e. g., using water to separate the oxygenated compounds as a water solution. Still another source of these wide-boiling mixtures of oxygenated organic compounds is in the products of hydrocarbon oxidation where both oil and water layers are obtained, each of which contain oxygenated organic compounds. A typical example of the composition of a water layer obtained in the Fischer process is as follows:

|  | Normal Boiling Point, °C. | Azeotrope with $H_2O$, Boiling Pt., °C. |
|---|---|---|
| Water (90.1 wt. per cent) | | |
| Alcohols (3.7 wt. per cent): | | |
| methyl | 64.7 | none |
| ethyl | 78.5 | 78.1 |
| isopropyl | 82.3 | 80.4 |
| tertiary butyl | 82.8 | 79.9 |
| normal propyl | 97.2 | 87.7 |
| secondary butyl | 99.5 | 87.5 |
| isobutyl | 107.3 | 89.9 |
| normal butyl | 117.7 | 92.2 |
| normal amyl | 138 | 95.8 |
| secondary amyl | 119.9 | 92.3 |
| tertiary amyl | 102.4 | 87.2 |
| iso amyl | 131.6 | 95.2 |
| Aldehydes (1.0 wt. per cent): | | |
| acetaldehyde | 20.2 | none |
| propionaldehyde | 48.8 | none |
| n-butyraldehyde | 75.7 | 68 |
| normal valeraldehyde | 103.7 | 80.6 |
| isovaleraldehyde | 92.5 | 82 |
| Ketones (0.6 wt. per cent): | | |
| acetone | 56.1 | none |
| methyl ethyl ketone | 79.6 | 73.6 |
| methyl propyl ketone | 102.3 | 82.9 |
| methyl isopropyl ketone | 94.3 | |
| methyl normal butyl ketone | 127.8 | |
| methyl isobutyl ketone | 116.0 | 87.9 |
| diethyl ketone | 102.0 | |
| Esters (0.1 wt. per cent): | | |
| ethyl acetate | 77.2 | 70.4 |
| normal propyl acetate | 101.6 | 82.4 |
| ethyl propionate | 99.1 | 81.2 |
| Acids (4.5 wt. per cent): | | |
| acetic | 118 | none |
| propionic | 141 | 99.98 |
| butyric | 162.5 | 99.4 |
| valeric | 185 | 99.5 |
| Hydrocarbons (trace) | | |
| Ethers (trace) | | |
| Ketals (trace) | | |
| Acetals (trace) | | |

The separation of the normal primary alcohols from such a complex mixture is difficult to accomplish and cannot be done entirely by ordinary distillation because of the fact that many of the compounds boil within very narrow ranges or form aqueous azeotropes boiling close together. In addition, the alcohols form azeotropes with other oxygenated compounds with and without water as a component, thus further complicating the separation.

If the crude aqueous mixtures of the alcohols are subjected to ordinary fractionation, it is quite feasible to obtain narrow cuts which contain the following types of alcohol mixtures, although in practical separations alcohols from one group are generally found in the preceding and succeeding groups due to the inefficiency of the fractionating system:

TABLE

*Narrow-boiling range mixtures of alcohols*

| Components | | Normal B. P., °C. | Aqueous Azeotrope B. P., °C. |
|---|---|---|---|
| Group I | methanol | 64.7 | |
| | ethanol | 78.3 | 78.1 |
| | isopropanol | 82.4 | 80.2 |
| Group II | normal propanol | 97.2 | 87.7 |
| | isobutanol | 107.9 | 88.9 |
| | secondary butanol | 99.5 | 88.5 |
| | tertiary pentanol | 101.8 | 87.0 |
| Group III | normal butanol | 117.7 | 92.2 |
| | iso-pentanol | 131.6 | 95.2 |
| | secondary pentanol | 119.2 | 92.3 |
| | normal pentanol | 137.9 | 95.0 |
| | pentanol-3 | 115.4 | 91.7 |

It is to be noted that the aqueous azeotropes of the alcohols in the above types of narrow-cut mixtures have boiling points which differ less than 5° C., which fact makes difficult their further separation by ordinary fractionation even if the narrow boiling range mixture is only a binary or tertiary mixture of the alcohols. Generally, the crude mixtures contain more than two of the alcohols and other oxygenated organic compounds that interfere with separation by ordinary fractionation, but these do not interfere with the basic operation of this invention in isolating the desired principal alcohol components of the mixtures.

It is, therefore, the main object of this invention to provide a process in which the above difficulties are overcome and the lower boiling normal primary alcohols are separated in pure form.

This and other objects of this invention are accomplished by subjecting the crude mixture of oxygenated compounds, either before or after separation from the acids, to a preliminary treatment to remove undesirable non-alcoholic components and then subjecting the alcohols to an extractive distillation to obtain an overhead fraction containing the branched primary, secondary and tertiary alcohols and a bottoms fraction consisting entirely of normal primary alcohols. The normal primary alcohols are then separated by straight distillation.

Figure 2:
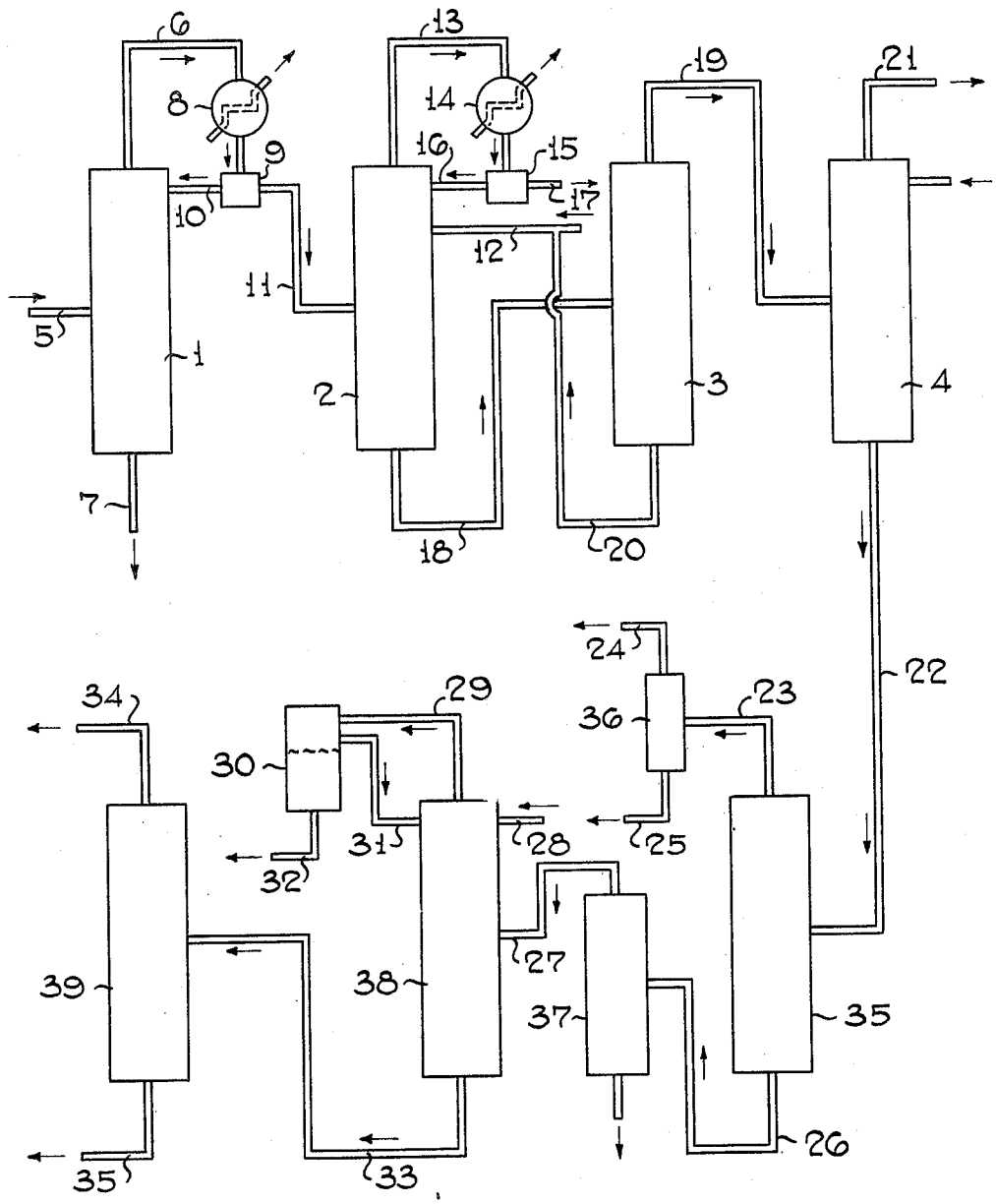

For a further understanding of the invention, reference may be had to the accompanying drawings in which:

Figure 1 is a chart showing the volatilities of various alcohols in water relative to ethanol at water concentrations between 80 mol percent and infinite dilution, and Figure 2 is a diagrammatic elevational view of a flow plan embodying the improvements of the present invention.

The present invention is made possible by the discovery that when a mixture of oxygenated compounds, such as those mentioned above, is factionally distilled in the presence of a liquid reflux containing a sufficiently large volume percent of water, the volatilities of the oxygenated compounds are altered to such an extent that separations which were impossible by ordinary fractionation become possible in the presence of the excess water, and chemical reactions which occur in the absence of water are substantially prevented. When this principle is used to separate economically desirable normal primary alcohols from economically not-so-desirable branched primary, secondary and tertiary alcohols, the volatilities of many of the normal primary alcohols are so closely similar to some of the less desirable alcohols that complete segregation of the normal primary alcohols is difficult, if not impossible, to achieve. However, when ethyl alcohol is the major alcohol component and the other alcohols are present in small quantities reative to ethanol, it has been found that substantially complete separation between the normal primary alcohols can be obtained provided the amount of water in the reflux is maintained within closely controlled limits from 82 to 93.5 mol percent inclusive (preferably, 86-91 mol percent). This is clearly seen from Figure 1 which shows the volatilities relative to ethanol of the various primary normal, branched primary, secondary and tertiary alcohols in the presence of 80 to 100 mol percent water.

The relative volatility shown as the ordinate of the curves of Figure 1 is the volatility of one component divided by that of the other, the volatility of each component being proportional to its partial pressure divided by its mol fraction in the liquid phase. It is also defined by the equation: alpha=$(y_1/y_2)/(x_1/x_2)$ where $y$ refers to the vapor phase mol fractions of the components to be separated and $x$ refers to the liquid phase mol fractions of the components to be separated. Subscript 1 designates the non-ethanol component and subscript 2 designates ethanol.

It is evident from Figure 1 that normal butanol is the most volatile primary normal alcohol between water concentrations of approximately 88 and 95 mol percent. At about 88 mol percent normal butanol becomes less volatile than either ethanol or normal propanol and below about 88 mol percent ethanol becomes the most volatile normal primary alcohol. In addition, it can be seen that no non-normal primary alcohol is less volatile than either normal butanol or normal propanol between water concentrations of 94 and 82.5 mol percent. Above 94 mol percent water concentration isopropanol becomes less volatile than normal butanol and below 82.5 mol percent water concentration, pentanol-2 becomes less volatile than ethanol. It is thus clear that only within the regions between water concentrations of 82.5 and 94 mol percent can normal primary alcohols be separated from non-normal primary alcohols. However, at water concentrations greater than 93.5 mol percent and less than 83 mol percent the primary normal alcohol curves converge so closely to the non-primary normal alcohol curves that separation is not economically feasible. It is equally clear that the region of maximum ease of separation and therefore that of substantially complete separation, between normal primary and non-normal primary alcohols, lies within water concentrations of 86 and 91 mol percent.

The above discussion is based on the assumption that the mixture to be separated contains some of each of the alcohols from $C_1$ to $C_5$ carbon atoms. However, if certain secondary or branched chain primary alcohols are not present in the crude mixture being separated, then the limits of water concentration shift somewhat. For example, if isopropanol is absent, then the upper limit of water concentration can be increased to 96.5 mol percent, and the region of substantially complete separation can be increased to 95 mol percent. If pentanol-2 is absent then the minimum water concentration can be lowered to 80 mol percent and the region where substantially complete separation is obtained to 82 mol percent. Since secondary and isobutanol are of intermediate volatility with regard to other secondary, tertiary and branched primary alcohols, absence of these compounds from the mixture would not appreciably affect the separation and would not change the operable water concentrations.

The aqueous reflux used may be water or other solvent of high water content, such as aqueous solutions of salts as the chlorides, nitrates, sulfates, acetates, etc., of sodium, potassium, ammonium and the like, dilute aqueous solutions of organic acids, such as those obtained by distilling the crude water layer from the Fischer synthesis, dilute mineral acids, etc.

It may be desirable to provide some method of removing undesired non-alcoholic constituents from the alcohols. This is preferably accomplished by means of an extractive distillation with water as described in copending application, Serial No. 794,589, filed December 30, 1947. This preliminary extractive distillation to separate non-alcoholic constituents is carried out in the presence of a much wider range of water concentrations than that used in the second step to separate the normal primary alcohols. Thus, the water concentration for separating non-alcoholic compounds from alcohol may be between 65 and 99 mol percent on each plate, preferably 75 to 85 mol percent. When operated in this manner it is generally desirable to separate the bulk of the water between the two extractive distillation stages. However, it may be desirable in many cases to pass the bottoms from the first extractive distillation step directly to the second extractive distillation step. When operating in this manner, the water concentration in the first step should be kept below 86 mol percent and preferably below 80 mol percent. In addition to the above process the non-alcoholic constituents may be removed by chemical means, such as hydrogenation. Mild hydrogenation conditions will leave only alcohols and esters and perhaps ethers while more drastic hydrogenation will also reduce esters to the corresponding alcohols. For the hydrogenation, any of the well known hydrogenation catalysts such as copper chromite, nickel on kieselguhr, Raney nickel, platinum, platinum oxide, catalysts containing cobalt or iron, may be used under pressures ranging from 14 to 10,000 lbs. and at temperatures ranging from 25 to 300° C. The above process can be applied to any selected fraction or the entire aqueous mixture of neutral compounds.

To obtain the desired separation of lower normal alcohols from mixtures, such as those mentioned with the benefits of the present invention, the mixture of alcohols free of non-alcoholic constituents is subjected to a continuous fractional distillation in a column of practical size, including a rectification zone and a stripping zone for countercurrent vapor-liquid contact under reboiling and refluxing conditions. A sufficiently large quantity of water or other aqueous reflux is introduced into an upper part of the rectification zone to effectively modify the relative volatilities of the organic compounds to be separated. The separation can be effected in a continuous manner under steady state conditions to obtain product streams of desired purities and constant compositions while supplying the large quantity of water to the upper part of the rectification zone. The temperature of the water introduced in the rectification zone is preferably close to the temperature of the liquid on the feed plate, although it may be lowered to partially condense vapors ascending to the water feed plate. In some cases it may be desirable to carry out the distillation under superatmospheric pressures and at higher temperatures.

Since the efficient separation is essentially continuous, the reflux has to be added continuously near the top of the fractionating column while the mixture of oxygenated organic compounds to be separated is fed continuously into the column at a lower point. Sufficient heat is provided to afford distillation throughout the column.

Referring now to Figure 2, a fraction of the above composition obtained in the Fischer synthesis is introduced by line 5 into an intermediate point of tower 1, the interior of which is provided with means for obtaining efficient countercurrent liquid-vapor contacting, e. g., such conventional means as bubble plates or packing. Column 1 is maintained under such conditions of temperature, feed rate, reflux ratio, etc., that all compounds more volatile than the acids are removed overhead. These include alcohols, ketones, aldehydes, esters, ethers, acetals, ketals, and any small amount of hydrocarbons present.

These compounds are withdrawn through line 6, leaving an aqueous acid bottoms which is withdrawn through line 7. The overhead vapors are passed through condenser 8 to a receiver 9. A portion of the condensate collected in receiver 9 is returned to the top of column 1 as external reflux through line 10. The remaining portion of the distillation collected in receiver 9 is withdrawn through line 11. The mixture is then introduced into the middle portion of tower 2 where it is fractionated in the presence of a liquid stream of water introduced through line 12. Conditions are maintained in tower 2 such as to cause distillation of the oxygenated compounds in the presence of the water on each plate of the tower. A sufficient amount of water is added so that it is present to the extent of 70 mol percent on most of the plates. Thus, the overhead vapors from tower 2 consist of carbonyls, esters, hydrocarbons (if present), ethers, ketals, acetals, a trace of alcohols and water. These are withdrawn through line 13, condensed in cooler 14 and collected in receiver 15. A portion of the material in receiver 15 is passed by line 16 to the top of tower 2 as external reflux. The remainder is withdrawn through line 17 for further separation, if desired.

The alcohols, free of undesired materials, are removed from the bottom of tower 2 through line 18 and passed to the mid-point of tower 3 where they are distilled to separate aqueous alcohols overhead through line 19 and leave the bulk of the water, free of alcohols, as a bottoms product which is withdrawn through line 20 and recycled to line 12 where it may be used as reflux in tower 2. The aqueous alcohols removed through line 19 are passed to tower 4 where they are fractionally distilled in the presence of a sufficient amount of water introduced near the top of the tower so as to alter the normal volatilities of the oxygenated compounds to such an extent that separations ordinarily difficult to perform are easily accomplished.

The feed to column 4 is preferably introduced between an upper rectification section and a lower stripping section at a point where the ratio of the main organic compounds to be separated in the feed to the column is similar to the ratio of these compounds in the internal reflux descending through the column. The feed is preferably introduced at a temperature close to that of the internal liquid reflux under practically equilibrium boiling conditions at the point of introduction.

With adequate water concentration in the internal reflux for effecting the separation, the normal alcohols to be isolated in the aqueous bottoms are dissolved in the aqueous internal reflux that reaches the bottom of the rectification zone and finally the bottom of the stripping zone.

The bottoms fraction, which contains the desired alcohols as a solution in water, is removed through line 22 and passed to tower 35 where it is distilled to separate methanol and ethanol-water azeotrope overhead through line 23. The mixture of methanol and ethanol can then be separated by distillation in tower 36 from which anhydrous methanol is removed overhead through line 24 and aqueous ethanol remains as a bottoms product and is withdrawn through line 25. Returning now to tower 35, a bottoms product consisting of a solution of normal propyl and higher alcohols is removed through line 26 and passed to tower 37 where it is distilled to remove the bulk of the water. A concentrated solution of alcohols in water is removed from tower 37 through line 27 and introduced into the midsection of tower 38 where the remaining water is removed. This dehydration is preferably carried out in the presence of an entrainer, such as isopropyl ether or any other entrainer well known in the art. Accordingly, isopropyl ether is added to column 38 through line 28 and the azetrope of isopropyl ether and water is removed overhead through line 29 and passed to decanter 30 where two layers are formed. The upper or isopropyl ether-rich layer is recycled to the column through line 31. Substantially ether-free water is removed through line 32 and discarded. The distillation is continued until all of the water has been removed from the column and a substantially anhydrous mixture of alcohols remains in the bottom of tower 38. These alcohols are removed through line 33 and passed to tower 39 when normal propyl alcohol is removed overhead through line 34, leaving normal butanol and normal pentanol in the bottoms which is removed through line 35. These can be separated in another fractional distillation column, not shown.

From the above description it is evident that a means has been provided for separating lower boiling normal alcohols from their admixture with secondary, tertiary and normal branched alcohols.

While one specific process embodying the novel steps of the present invention, as well as one specific apparatus for carrying out the same, has been described in considerable detail, it is to be understood that this description is illustrative only, and for the purpose of making the invention clearer, and it is not intended that the invention shall be construed as limited to details of the description except insofar as such limitations have been included in the terms of the following claims in which it is the intention to claim all novelty inherent in the process according to the present invention.

The nature and objects of the present invention having been thus fully set forth and specific examples of the same given, what is claimed as new and useful and desired to be secured by Letters Patent is:

1. The method of separating a wide-boiling mixture of normal primary, secondary, tertiary and branched primary alcohols, boiling within the range of n-pentanol and including ethanol wherein ethanol is present as the major alcohol constituent and the remaining alcohols are present only in minor quantities relative to ethanol, which comprises introducing said mixture into the mid-section of a fractionation zone wherein vapors of said alcohols ascend countercurrently to a liquid reflux of the alcohols dissolved in 83–93.5 mol percent of water whereby the normal volatility relationships of the alcohols are altered and the secondary, tertiary and branched primary alcohols are rendered more volatile and vaporized, continuously removing vapors of the secondary, tertiary, and branched primary alcohols overhead from the fractionation zone and removing as bottoms a dilute aqueous solution of normal alcohols free of secondary, tertiary and branched primary alcohols.

2. The method of separating a wide-boiling aqueous mixture of normal primary, secondary, tertiary and branched primary alcohols, boiling within the range of n-pentanol and including ethanol wherein ethanol is present as the major alcohol constituent and the remaining alcohols are present only in minor quantities relative to ethanol, which comprises introducing said mixture into the mid-section of a fractionation zone wherein vapors of said alcohols ascend countercurrently to a liquid reflux of the alcohols dissolved in 83–93.5 mol percent of water whereby the normal volatility relationships of the alcohols are altered and the secondary, tertiary and branched primary alcohols are rendered more volatile and vaporized, continuously removing vapors of the secondary, tertiary, and branched primary alcohols overhead from the fractionation zone and removing as bottoms a dilute aqueous solution of normal alcohols free of secondary, tertiary and branched primary alcohols.

3. The method of separating an aqueous mixture of methanol, ethanol, normal propanol, isopropanol, normal butanol, isobutanol, secondary butanol, tertiary butanol, normal pentanol, iso pentanol, pentanol-2, pentanol-3, and higher alcohols boiling within the range of normal pentanol wherein ethanol is present as the major alcohol constituent and the remaining alcohols are present only in minor quantities relative to the ethanol, which comprises introducing said mixture into the mid-section of a fractionation zone wherein vapors of said alcohols ascend countercurrently to a liquid reflux of the alcohols dissolved in 83–93.5 mol percent of water whereby the normal volatility relationships of the alcohols are altered and all the secondary, tertiary and branched primary alcohols are rendered more volatile and vaporized, continuously removing vapors of all of the secondary, tertiary and branched primary alcohols overhead and removing a dilute aqueous solution of methanol, ethanol, normal propanol, normal butanol and n-pentanol as bottoms.

4. A process of separating secondary, tertiary and branched primary alcohols from their mixture with normal primary alcohols boiling within the range of n-pentanol and including ethanol wherein ethanol is present as the major alcohol constituent and the remaining alcohols are present only in minor quantities relative to ethanol, which comprises continuously passing a dilute aqueous solution of the alcohols down through a stripping zone so that a liquid portion of said solution flows countercurrently in contact with vapors evolved therefrom under constant refluxing and reboiling conditions, maintaining a sufficient amount of water in the resulting internal reflux to effect vaporization of a larger part of the secondary, tertiary and primary branched alcohols than of the normal alcohols in said reflux, continuously withdrawing vapors of water mixed with vapors of the alcohols overhead from the stripping zone, the secondary, tertiary and primary branched alcohols being then wthdrawn as vapor at substantially the same rate that these alcohols dissolved in said aqueous solution enter the stripping zone, and withdrawing from the bottom part of the stripping zone a dilute aqueous solution of normal alcohols free from secondary, tertiary, and primary branched alcohols.

5. The method of separating an aqueous mixture of methanol, ethanol, normal propanol, normal butanol, isobutanol, secondary butanol, tertiary butanol, normal pentanol, isopentanol, pentanol-2, pentanol-3, and higher alcohols boiling within the range of normal pentanol but free of isopropanol and wherein ethanol is present as the major alcohol constituent and the remaining alcohols are present only in minor quantities relative to the ethanol, which comprises introducing said mixture into the midsection of a fractionation zone wherein vapors of said alcohols ascend countercurrently to a liquid reflux of the alcohols dissolved in 83–96.5 mol percent of water whereby the normal volatility relationships of the alcohols are altered and all the secondary, tertiary and branched primary alcohols are rendered more volatile and vaporized, continuously removing vapors of all of the secondary, tertiary and branched primary alcohols overhead and removing a dilute aqueous solution of methanol, ethanol, normal propanol, normal butanol and n-pentanol as bottoms.

6. The method of separating an aqueous mixture of methanol, ethanol, normal propanol, isopropanol, normal butanol, isobutanol, secondary butanol, tertiary butanol, normal pentanol, isopentanol, and higher alcohols boiling within the range of normal pentanol but free of pentanol-2 and wherein ethanol is present as the major alcohol constituent and the remaining alcohols are present only in minor quantities relative to the ethanol, which comprises introducing said mixture into the midsection of a fractionation zone wherein vapors of said alcohols ascend countercurrently to a liquid reflux of the alcohols dissolved in 80–93.5 mol percent of water whereby the normal volatility relationships of the alcohols are altered and all the secondary, tertiary and branched primary alcohols are rendered more volatile and vaporized, continuously removing vapors of all of the secondary, tertiary and branched primary alcohols overhead and removing a dilute aqueous solution of methanol, ethanol, normal propanol, normal butanol and n-pentanol as bottoms.

7. The method of separating an aqueous mixture of methanol, ethanol, normal propanol, isopropanol, normal butanol, tertiary butanol, normal pentanol, isopentanol, pentanol-2, pentanol-3, and higher alcohols boiling within the range of normal pentanol wherein ethanol is present as the major alcohol constituent and the remaining alcohols are present only in minor quantities relative to the ethanol, which comprises introducing said mixture into the midsection of a fractionation zone wherein vapors of said alcohols ascend countercurrently to a liquid reflux of the alcohols dissolved in 83–93.5 mol percent of water whereby the normal volatility relationships of the alcohols are altered and all the secondary, tertiary and branched primary alcohols are rendered more volatile and vaporized, continuously removing vapors of all of the secondary, tertiary and branched primary alcohols overhead and removing a dilute aqueous solution of methanol, ethanol, normal propanol, normal butanol and n-pentanol as bottoms.

8. The method of separating a wide-boiling mixture of normal primary, branched primary, secondary and tertiary alcohols, esters, ethers, hydrocarbons, ketones, acetals, ketals, and aldehydes said alcohols boiling within the range of n-pentanol and including ethanol wherein ethanol is present as the major alcohol constituent and the remaining alcohols are present only in minor quantities relative to the ethanol, which comprises continuously introducing said organic mixture into the mid-section of a first fractionation zone, introducing into the top of said first fractionation zone a sufficient amount of water to maintain between 65 and 99 mol percent of water in the internal reflux, removing overhead from said first distillation zone ethers, hydrocarbons, esters, ketones and aldehydes and removing from the bottom of said first distillation zone the alcohols as a solution in water, introducing the alcohols into the midpoint of a second fractionation zone, introducing into the top of said second fractionation zone a sufficient amount of water to maintain between 83 and 93.5 mol percent of water on each plate, removing overhead from said second fractionation zone the branched primary, secondary and tertiary alcohols and removing the normal primary alcohols as a solution in water from the bottom of said fractionation zone.

CHARLES E. MORRELL.
CARL S. CARLSON.
PAUL V. SMITH, Jr.

REFERENCES CITED

The following references are of record in the file of this patent:

UNITED STATES PATENTS

| Number | Name | Date |
| --- | --- | --- |
| 887,793 | Guillaume | May 19, 1908 |
| 2,290,442 | Metzl | July 31, 1942 |
| 2,321,748 | Hopkins et al. | June 15, 1943 |

OTHER REFERENCES

Karrer: Organic Chemistry, second English edition published 1946 by the Elseuier Book Company, Inc., 215 Fourth Avenue, New York 3, New York; copy in Div. 25; pages 90, 91, 92.